United States Patent [19]
Walker et al.

[11] Patent Number: 5,799,178
[45] Date of Patent: Aug. 25, 1998

[54] SYSTEM AND METHOD FOR STARTING AND MAINTAINING A CENTRAL PROCESSING UNIT (CPU) CLOCK USING CLOCK DIVISION EMULATION (CDE) DURING BREAK EVENTS

[75] Inventors: Gary Walker; Mike Crews, both of Phoenix; James Steele, Chandler, all of Ariz.

[73] Assignee: VLSI Technology, Inc., San Jose, Calif.

[21] Appl. No.: 634,794

[22] Filed: Apr. 19, 1996

[51] Int. Cl.⁶ .................................................. G06F 1/04
[52] U.S. Cl. ...................................... 395/557; 395/560
[58] Field of Search .............................. 395/557, 559, 395/560, 750.04

[56] References Cited

U.S. PATENT DOCUMENTS

| | | | |
|---|---|---|---|
| 5,546,568 | 8/1996 | Bland et al. | 395/556 |
| 5,585,745 | 12/1996 | Simmons et al. | 326/93 |
| 5,657,483 | 8/1997 | Kardach et al. | 395/560 |

*Primary Examiner*—Dennis M. Butler
*Attorney, Agent, or Firm*—Harry M. Weiss; Jeffrey D. Moy; Harry M. Weiss & Associates, P.C.

[57] ABSTRACT

The present invention relates to a system and method for starting and maintaining a Central Processing Unit (CPU) clock even though the CPU clock is operating under a Clock Division Emulation (CDE) scheme. Break Events are broken into different groups with each group of Break Events being mapped to a particular programmable event timer. Each of the programmable event timers have an associated time limit which will keep the CPU clock running for a time commensurate with that group of Break Events. When a Break Event occurs, the programmable event timer associated with that particular Break Event will load the corresponding time limit into the programmable event timer. Once loaded, the programmable event timer will keep the CPU clock running during the entire time limit. Only after all of the programmable event timers have counted down will the CPU clock be allowed to stop.

4 Claims, 1 Drawing Sheet

SYSTEM AND METHOD FOR STARTING AND MAINTAINING A CENTRAL PROCESSING UNIT (CPU) CLOCK USING CLOCK DIVISION EMULATION (CDE) DURING BREAK EVENTS

BACKGROUND OF THE INVENTION

1. Field of the Invention

This invention relates to computer systems and, more specifically, to a system and method for starting and maintaining a Central Processing Unit (CPU) clock using Clock Division Emulation (CDE) during a Break Event in the computer system.

2. Description of the Prior Art

Clock Division Emulation (CDE) is a scheme of alternately stopping and starting (from off to full speed) the Central Processing Unit (CPU) clock so that the power consumed by the CPU is reduced when compared to the CPU continuously running at full speed. For Combined Metal Oxide Semiconductor (CMOS) circuitry, power consumption is approximately proportional to the number of clock cycles fed into the CMOS circuitry. By reducing the average number of clock cycles fed to the CPU, power consumption of the computer system will be reduced.

A problem arises in computer systems using a CDE scheme when a Break Event occurs in the computer system. A Break Event is any type of interrupt (i.e., a keystroke, mouse movement, modem ring, etc.) which requires software running on the CPU to perform some kind of action in response to the interruption. Servicing the interrupt usually requires the CPU clock to run (usually at full speed) in order to execute the necessary software routine used to update the computer system in a manner consistent with the Break Event. If the computer system were to continue to run under a CDE scheme, the performance of the CPU might be so poor that the service routine would break, causing the computer system to hang or possibly crash.

Another problem exists in determining how long the CPU clock should remain running and the CDE scheme suspended so that the software has enough time to service the Break Event. If the CPU clock is not turned off in a reasonable amount of time after the Break Event has been serviced, this will result in poor performance in the computer system, actually breaking the computer system, or wasting substantial amounts of power.

In the past, a single timer was used to keep the CPU clock running for a certain amount of time after a Break Event was detected. The timer was programmed with a sufficient amount of time to satisfy the time requirements of the longest Break Event servicing routine. However, as stated above, if the CPU clock is not turned off in a reasonable amount of time after the Break Event has been serviced, this will result in poor performance in the computer system, actually breaking the computer system, or wasting substantial amounts of power.

Therefore, a need existed to provide a system and method for determining how long the CPU clock will be allowed to run in order to service a particular type of Break Event. This will allow for better power management in the computer system while still providing maximum performance.

SUMMARY OF THE INVENTION

In accordance with one embodiment of the present invention, it is an object of the present invention to provide an improved system and method for starting and maintaining the CPU clock during a Break Event in the computer system.

It is another object of the present invention to provide an improved system and method for starting and maintaining the CPU clock during a Break Event in the computer system that determines how long the CPU clock will be allowed to run in order to service a particular type of Break Event thereby allowing for better power management in the computer system while still providing maximum performance.

BRIEF DESCRIPTION OF THE PREFERRED EMBODIMENTS

In accordance with one embodiment of the present invention, a system for starting and maintaining a CPU clock having a Clock Division Emulation (CDE) scheme during Break Events in the computer system is disclosed. The system is comprised of CPU clock means for controlling the speed of operation of the computer system. CDE signalling means are coupled to the CPU clock means for sending a signal to alternately stop and start the CPU clock means to reduce the power consumption of the computer system. Timer means are coupled to the CPU clock means for allowing the CPU clock means to continue to run for predetermined time periods for servicing of the Break Events in the computer system. The timer means is comprised of at least two programmable event timer means each of the at least two programmable event timer means are programmed with different time limits for allowing the CPU clock means to continue to run for sufficient amounts of time for servicing different types of Break Events. Logic gate means having an input coupled to each of the at least two programmable event timer means are provided for preventing the CPU clock means from stopping prior to all of the at least two programmable event timer means expire.

In accordance with another embodiment of the present invention, a method of providing a system for starting and maintaining a CPU clock having a CDE scheme during Break Events in a computer system is disclosed. The method is comprised of the steps of: providing CPU clock means for controlling the speed of operation of the computer system; providing CDE signalling means coupled to the CPU clock means for sending a signal to alternately stop and start the CPU clock means to reduce power consumption of the computer system; and providing timer means coupled to the CPU clock means for allowing the CPU clock means to continue to run for predetermined time periods for servicing of the Break Events in the computer system. The step of providing timer means may further be comprised of the steps of: providing at least two programmable event timer means wherein each of the at least two programmable event timer means programmed with different time limits for allowing the CPU clock means to continue to run for sufficient amounts of time for servicing different types of Break Events; and providing logic gate means having an input coupled to each of the at least two programmable event timer means for preventing the CPU clock means from stopping prior to all of the at least two programmable event timer means expire.

The foregoing and other objects, features, and advantages of the invention will be apparent from the following, more particular, description of the preferred embodiments of the invention, as illustrated in the accompanying drawings.

DETAILED DESCRIPTION OF THE PREFERRED EMBODIMENT

Figure 1:
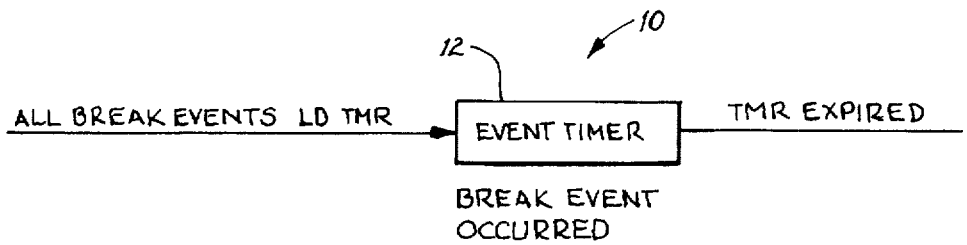
FIG. 1 is a simplified block diagram of a prior art system which allows the CPU clock to run for a predetermined time period when a Break Event is detected in the computer system.

Referring to FIG. 1, a prior art system 10 used in computer systems having a Clock Division Emulation (CDE) scheme for starting and maintaining a Central Processing Unit (CPU) clock during Break Events is shown. The system 10 is basically comprised of a single event timer 12. When a Break Event is detected in the computer system, the event timer 12 is loaded with a preprogrammed time limit. The amount of time programmed into the event timer 12 is enough to satisfy the time requirements of the longest Break Event servicing routine. The problem with the system 10 is that it allows the CPU clock to run at full speed for longer periods of time then what is required for most Break Event servicing routines. This results in poor performance, actually breaking the computer system, and/or wasting substantial amounts of battery power.

Figure 2:
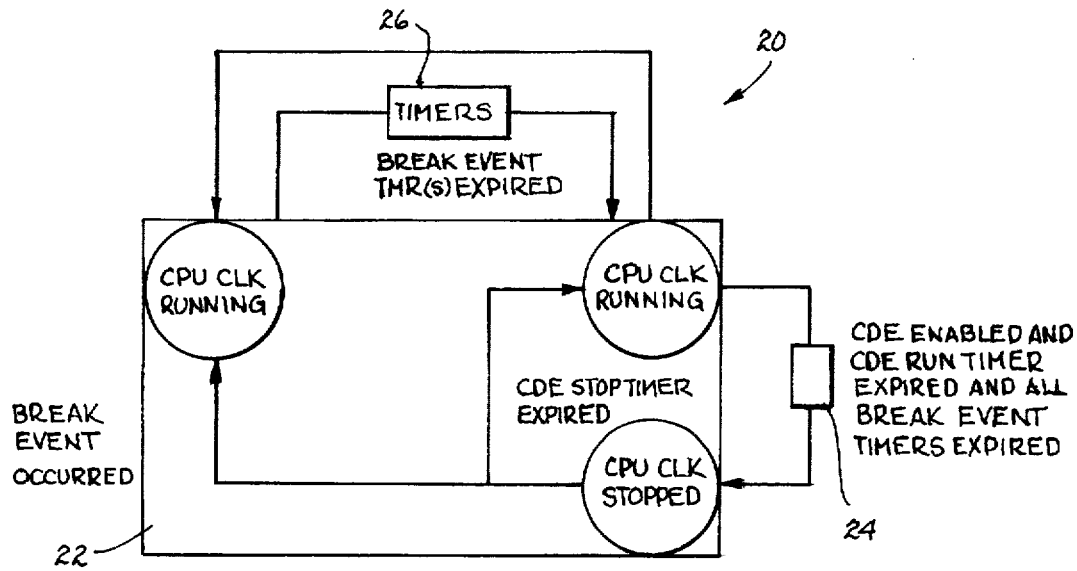
FIG. 2 is a simplified block diagram of a system which allows the CPU clock to run for different amounts of time based on the type of Break Event detected by the computer system.

Referring to FIG. 2, an improved system 20 is shown for starting and maintaining a CPU clock 22 during Break Events in a computer system utilizing a CDE scheme. The system 20 is comprised of a CPU clock 22, a CDE signalling device 24, and a timer device 26.

The CPU clock 22 is used for controlling the speed of operation of the computer system. The CPU clock 22 is coupled to the CDE signalling device 24. The CDE signalling device 24 is used for sending a signal to alternately stop and start the CPU clock 22 in order to reduce the power consumption of the computer system. A programmable timer device 26 is coupled to the CPU clock 22 for allowing the CPU clock 22 to continue to run for predetermined time periods for servicing of different types of Break Events that may occur in the computer system.

Figure 3:
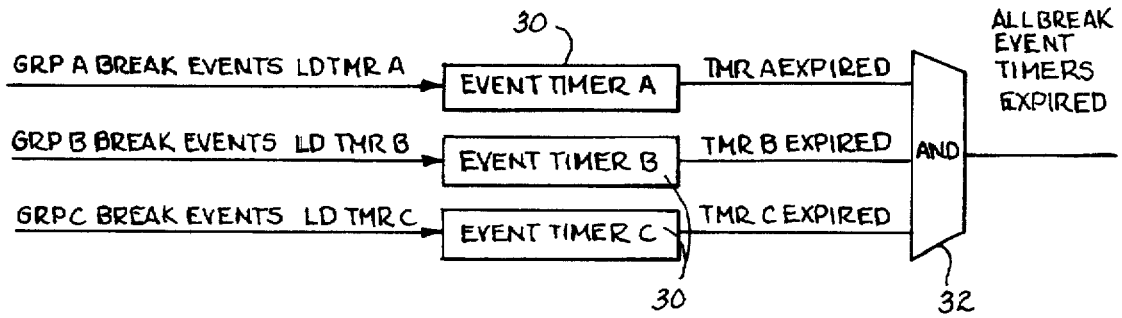
FIG. 3 is a simplified block diagram of a programmable event timer device used in the system depicted in FIG. 2.

Referring to FIG. 3, a simplified functional block diagram of the timer device 26 is shown. The timer device 26 is comprised of several (i.e., more than one) programmable event timers 30. Each of the programmable event timers 30 are used to determine how long the CPU clock will be turned on for servicing different types of Break Events. Each of the different Break Events will be categorized into groups with each group of Break Events being mapped to one of the programmable event timers 30. For example, Break Events caused by interrupt based activity might be mapped to a programmable event timer 30 programmed with a programmable time limit in the sub 1 millisecond range; Break Events caused by video based activity might be mapped to a programmable event timer 30 programmed with a programmable time limit in the millisecond range; and Break Events caused by Input/Output (I/O) based activity might be mapped to a programmable event timer 30 programmed with a programmable time limit in the hundreds of millisecond range.

When a Break Event occurs, the programmable event timer 30 associated with that particular Break Event will load the corresponding time limit into the programmable event timer 30. Once loaded, the programmable event timer 30 will keep the CPU clock running during the entire time limit. This allows the service routine servicing the Break Event enough time to perform the required actions (by hardware and/or software) necessary to update the computer system in a manner consistent with the Break Event that had just occurred. It also allows the CPU clock 22 to be shut down relatively soon after the service routine is completed. Each of the programmable event timers 30 are designed so that if several Break Events are mapped to the same programmable event timer 30, the programmable event timer 30 will reload the time limit even if the programmable event timer 30 is already counting down due to a previous Break Event that has been mapped to the same programmable event timer 30.

Each of the programmable event timers 30 are coupled to a logic gate 32. In the preferred embodiment of the present invention, the logic gate 32 is an AND gate. The logic gate 32 is used for preventing the CPU clock 22 (FIG. 2) from stopping prior to all of the programmable event timers 30 expiring. Only after all of the programmable event timers 30 have counted down will the CPU clock 22 (FIG. 2) be allowed to stop again.

While the invention has been particularly shown and described with reference to a preferred embodiment thereof, it should be understood by those skilled in the art that changes in form and detail may be made therein without departing from the spirit and scope of the invention.

What is claimed is:

1. A system for starting and maintaining a Central Processing Unit (CPU) clock having a Clock Division Emulation (CDE) scheme during Break Events in a computer system comprising, in combination:

CPU clock means for controlling a speed of operation of said computer system;

CDE signalling means coupled to said CPU clock means for sending a signal to only alternately stop and start said CPU clock means to reduce power consumption of said computer system; and timer means coupled to said CPU clock means for allowing said CPU clock means to continue to run for predetermined time periods for servicing of said Break Events in said computer system;

wherein said timer means comprises:

at least two programmable event timer means each of said at least two programmable event timer means programmed with different time limits for allowing said CPU clock means to continue to run for sufficient amounts of time for servicing different types of said Break Events, and logic gate means having an input coupled to each of said at least two programmable event timer means for preventing said CPU clock means from stopping prior to all of said at least two programmable event timer means expire:

wherein each of said at least two programmable event timer means may correspond to a different plurality of Break Events having similar time limits associated therewith within each of said different plurality of Break Events such that each of said at least two programmable event timer means may be reloaded with its corresponding time limit when a newly detected corresponding Break Event is recognized while a previously detected corresponding Break Event has already been recognized to commence its corresponding programmable event timer means count down.

2. A system for starting and maintaining a CPU clock using CDE in accordance with claim 1 wherein said logic gate means is an AND gate.

3. A method of providing a system for starting and maintaining a Central Processing Unit (CPU) clock having a Clock Division Emulation (CDE) scheme during Break Events in a computer system comprising the steps of:

providing CPU clock means for controlling a speed of operation of said computer system;

providing CDE signalling means coupled to said CPU clock means for sending a signal to only alternately stop and start said CPU clock means to reduce power consumption of said computer system; and providing timer means coupled to said CPU clock means for allowing said CPU clock means to continue to run for predetermined time periods for servicing of said Break Events in said computer system;

wherein said step of providing timer means further comprises the steps of:

providing at least two programmable event timer means each of said at least two programmable event timer means programmed with different time limits for allowing said CPU clock means to continue to run for sufficient amounts of time for servicing different types of said Break Events: and providing logic Rate means having an input coupled to each of said at least two programmable event timer means for preventing said CPU clock means from stopping prior to all of said at least two programmable event timer means expire:

wherein each of said at least two programmable event timer means may correspond to a different plurality of Break Events having similar time limits associated therewith within each of said different plurality of Break Events such that each of said at least two programmable event timer means may be reloaded with its corresponding time limit when a newly detected corresponding Break Event is recognized while a previously detected corresponding Break Event has already been recognized to commence its corresponding programmable event timer means count down.

4. The method of claim 3 wherein said step of providing logic gate means further comprises the step of providing an AND gate.

* * * * *